United States Patent
Kim et al.

(10) Patent No.: US 11,588,211 B2
(45) Date of Patent: Feb. 21, 2023

(54) AUTOMATIC PRESSURE JIG DEVICE FOR BRINGING ELECTRODE LEAD INTO CLOSE CONTACT WITH BUSBAR, AND BATTERY MODULE MANUFACTURING SYSTEM COMPRISING SAME

(71) Applicant: LG ENERGY SOLUTION, LTD., Seoul (KR)

(72) Inventors: Kyung-Mo Kim, Daejeon (KR); Jeong-O Mun, Daejeon (KR); Jin-Yong Park, Daejeon (KR); Jung-Hoon Lee, Daejeon (KR); Ho-June Chi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 297 days.

(21) Appl. No.: 16/768,018

(22) PCT Filed: Mar. 19, 2019

(86) PCT No.: PCT/KR2019/003200
§ 371 (c)(1),
(2) Date: May 28, 2020

(87) PCT Pub. No.: WO2019/245134
PCT Pub. Date: Dec. 26, 2019

(65) Prior Publication Data
US 2020/0365863 A1    Nov. 19, 2020

(30) Foreign Application Priority Data
Jun. 22, 2018  (KR) .................. 10-2018-0072157

(51) Int. Cl.
*H01M 50/502* (2021.01)
*B23K 37/04* (2006.01)
*H01M 10/04* (2006.01)

(52) U.S. Cl.
CPC .......... *H01M 50/502* (2021.01); *B23K 37/04* (2013.01); *H01M 10/04* (2013.01)

(58) Field of Classification Search
CPC ............... H01M 50/50–60; B23K 37/04–0461
(Continued)

(56) References Cited

U.S. PATENT DOCUMENTS

| 2016/0256963 A1 | 9/2016 | Hwang |
| 2018/0169790 A1 | 6/2018 | Jin et al. |

(Continued)

FOREIGN PATENT DOCUMENTS

| CN | 206415798 U | 8/2017 |
| JP | 11-226831 A | 8/1999 |

(Continued)

OTHER PUBLICATIONS

Extended European Search Report for European Application No. 19823083.1, dated May 31, 2021.
(Continued)

*Primary Examiner* — Matthew T Martin
*Assistant Examiner* — Katharine A Caughron
(74) *Attorney, Agent, or Firm* — Birch, Stewart, Kolasch & Birch, LLP

(57) ABSTRACT

Provided is an automatic pressing jig apparatus including: a plurality of contacting units configured to simultaneously press each of a plurality of bus bars provided in a battery module and press an end of a lead assembly from a top of the plurality of bus bars to prevent the lead assembly from protruding from a surface of the plurality of bus bars; a pair of pressing units connected to the plurality of contacting units and configured to adjust a pressing force of the plurality of contacting units with respect to the plurality of bus bars; a support frame supporting the pair of pressing units; and a distance adjusting unit connected to the support
(Continued)

frame and configured to ascend or descend the support frame to move the plurality of contacting units away from or close to the battery module.

15 Claims, 13 Drawing Sheets

(58) Field of Classification Search
USPC ... 228/212–213, 44.4, 44.7, 47.1, 49.1, 49.5
See application file for complete search history.

(56) References Cited

U.S. PATENT DOCUMENTS

2018/0277807 A1* 9/2018 Lorentz .............. H01M 50/502
2019/0386283 A1* 12/2019 Lee .................... H01M 50/502

FOREIGN PATENT DOCUMENTS

| JP | 2007-109548 A | 4/2007 |
|----|---------------|--------|
| JP | 2008-62243 A | 3/2008 |
| JP | 2012-109275 A | 6/2012 |
| JP | 2013-52420 A | 3/2013 |
| JP | 2018-6215 A | 1/2018 |
| JP | 2018-133136 A | 8/2018 |
| KR | 10-1124534 B1 | 3/2012 |
| KR | 10-2012-0064800 A | 6/2012 |
| KR | 10-1287417 B1 | 7/2013 |
| KR | 10-2015-0125387 A | 11/2015 |
| KR | 10-2015-0130047 A | 11/2015 |
| KR | 10-1750597 B1 | 6/2017 |
| KR | 10-1773644 B1 | 8/2017 |
| WO | WO 2017/146369 A1 | 8/2017 |
| WO | WO 2017/200177 A1 | 11/2017 |

OTHER PUBLICATIONS

International Search Report for PCT/KR2019/003200 (PCT/ISA/210) dated Jun. 21, 2019.

* cited by examiner

AUTOMATIC PRESSURE JIG DEVICE FOR BRINGING ELECTRODE LEAD INTO CLOSE CONTACT WITH BUSBAR, AND BATTERY MODULE MANUFACTURING SYSTEM COMPRISING SAME

TECHNICAL FIELD

The present application claims priority to Korean Patent Application No. 10-2018-0072157 filed on Jun. 22, 2018 in the Republic of Korea, the disclosures of which are incorporated herein by reference.

The present disclosure relates to an automatic pressing jig apparatus that closely contacts an electrode lead with a bus bar and a system for manufacturing a battery module including the same, and more particularly, to an automatic pressing job apparatus that is used to closely contact an electrode lead assembly of each of a plurality of groups of battery cell stacks with a bus bar simultaneously, and a system for manufacturing a battery module including the same.

BACKGROUND ART

In a general battery module, a bus bar is applied for electric connection between stacked battery cells, and a plurality of electrode leads drawn out respectively from a plurality of battery cells are bent and located on the bus bar to be welded.

When a battery module is manufactured as such, a bent electrode lead is pressed in a direction towards a bus bar by using a jig while the electrode lead is located on the bus bar such that the electrode lead closely contacts the bus bar, and then a laser beam is emitted on the electrode lead to perform welding.

Referring to FIGS. 1 and 2, a general battery module in which a plurality of pouch type battery cells are electrically connected to each other by a bus bar is shown.

Such a general battery module is manufactured by inserting an electrode lead 2 drawn out from each of a plurality of pouch type battery cells 1 into a lead slit 4 of a bus bar 3 as shown in FIG. 1, and then bending and welding the inserted electrode lead 2 in closely contact with the bus bar 3.

However, the general battery module complicates manufacturing processes because a process of bending the electrode lead 2 is additionally required in addition to a process of inserting the electrode lead 2 into the lead slit 4 of the bus bar 3 and a process of welding the electrode lead 2 to the bus bar 3.

Also, in case of a pouch type cell applied to a battery module, when the thickness of a cell is decreased, the length of an electrode lead is also decreased. As such, when the length of the electrode lead is decreased, a bonding area between the electrode lead and a bus bar is also decreased, thereby deteriorating combining strength and consequently increasing the possibility of product failure.

Accordingly, it is required to develop a battery module structure in which a bending process of an electrode lead can be omitted, and accordingly, it is also required to develop a new pressing jig for welding, which is suitable for a bonding structure of the electrode lead and a bus bar.

DISCLOSURE

Technical Problem

The present disclosure is designed to solve the problems of the related art, and therefore the present disclosure is directed to providing an automatic pressing jig apparatus that presses a bus bar from both sides such that welding is performed while the bus bar and an electrode lead are in close contact with each other, while manufacturing a battery module in which the electrode lead is combined to the bus bar via welding without being bent to be combined with the bus bar.

Also, the present disclosure is directed to providing an automatic pressing jig apparatus that performs a contacting operation through a single process while enabling close contact to be performed between an electrode lead assembly and a bus bar at a plurality of locations with uniform force, while closely contacting the electrode lead assembly of each of a plurality of groups of battery cell stacks with the bus bar.

In addition, the present disclosure is directed to providing an automatic pressing jig apparatus that enables a surface of a bus bar and an electrode lead assembly to form a same plane, while closely contacting the electrode lead assembly of each of a plurality of groups of battery cell stacks with the bus bar.

However, it is to be understood that the technical problems to be solved by the present disclosure are not limited to the above, and other problems that are not described here will become apparent to one of ordinary skill in the art from the description of the disclosure below.

Technical Solution

In one aspect of the present disclosure, there is provided an automatic pressing jig apparatus that closely contacts a lead assembly and a bus bar provided in a battery module to each other, the automatic pressing jig apparatus including: a plurality of contacting units configured to simultaneously press each of a plurality of bus bars provided in the battery module and press an end of the lead assembly from a top of the plurality of bus bars to prevent the lead assembly from protruding from a surface of the plurality of bus bars; a pair of pressing units connected to the plurality of contacting units and configured to adjust a pressing force of the plurality of contacting units with respect to the plurality of bus bars; a support frame supporting the pair of pressing units; and a distance adjusting unit connected to the support frame and configured to ascend or descend the support frame to move the plurality of contacting units away from or close to the battery module.

The plurality of contacting units may include a contacting frame moving downward by movement of the distance adjusting unit to press the plurality of bus bars from both sides.

The pair of pressing units may include a first pressing unit provided at one side of the plurality of contacting units and a second pressing unit provided at the other side of the plurality of contacting units, wherein the contacting frame may include a first contacting frame connected to the first pressing unit and a second contacting frame connected to the second pressing unit and coupled to the first contacting frame via a hinge.

The plurality of contacting units may further include a lead pressing frame provided inside the contacting frame and moved downward together with the contacting frame by the distance adjusting unit to press the lead assembly from the top of the plurality of bus bars.

The first contacting frame may include a first distance adjusting portion connected to the first pressing unit and a first pressing portion contacting the plurality of bus bars, and the second contacting frame may include a second distance adjusting portion connected to the second pressing unit and a second pressing portion contacting the plurality of bus bars.

The first contacting frame and the second contacting frame may be combined to each other via a hinge to increase a distance between the first pressing portion and the second pressing portion when a distance between the first distance adjusting portion and a second distance adjusting portion is decreased, and decrease the distance between the first pressing portion and the second pressing portion when the distance between the first distance adjusting portion and the second distance adjusting portion is increased.

The first pressing unit may include a first pressing rod connected to the first contacting frame and a first pressing actuator directly or indirectly connected to the first pressing rod to move the first pressing rod in a direction towards or away from the plurality of contacting units, and the second pressing unit may include a second pressing rod connected to the second contacting frame and a second pressing actuator directly or indirectly connected to the second pressing rod to move the second pressing rod in a direction towards or away from the plurality of contacting units.

An end of the first contacting frame connected to the first pressing rod and an end of the second contacting frame connected to the second pressing rod may not face each other to prevent the first pressing rod and the second pressing rod from interfering with each other.

The pair of pressing units each may further include: a first connecting plate having one side coupled to the first pressing rod and the other side coupled to an end of the first contacting frame; and a second connecting plate having one side coupled to the second pressing rod and the other side connected to an end of the second contacting frame.

The automatic pressing jig apparatus may further include a damper disposed between the first connecting plate and the first pressing rod and between the second connecting plate and the second pressing rod.

A first open portion may be provided between the first contacting frame and the second contacting frame.

The lead pressing frame may be fixed to the hinge and move together with the contacting frame.

A portion of the lead pressing frame contacting the lead assembly may have a shape of an H beam, a pair of second open portions communicating with the first open portion may be provided at both sides of a barrier wall forming the H beam, and the pair of second open portions may be provided at positions corresponding to the lead assembly.

A portion of the lead pressing frame contacting the lead assembly may include a pair of horizontal bars extending in parallel spaced apart from each other and a barrier wall connecting center portions of the pair of horizontal bars, wherein the pair of horizontal bars may press the lead assembly.

A distance between outer edge portions of the pair of horizontal bars may be equal to or less than a width of the lead assembly.

Advantageous Effects

According to one aspect of the present disclosure, a bus bar and an electrode lead can be welded while closely contacting each other, while manufacturing a battery module in which the electrode lead is combined to the bus bar via welding without being bent to be combined with the bus bar.

Also, according to another aspect of the present disclosure, a contacting operation can be performed through a single process while close contact is performed between an electrode lead assembly and a bus bar at a plurality of locations with uniform force, while closely contacting the electrode lead assembly of each of a plurality of groups of battery cell stacks with the bus bar.

In addition, according to another aspect of the present disclosure, a surface of a bus bar and an electrode lead assembly can form a same plane, while closely contacting the electrode lead assembly of each of a plurality of groups of battery cell stacks with the bus bar, and thus a portion of the electrode lead assembly protruding outside the surface of the bus bar is not present, thereby improving quality of electric connection.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, an overall configuration of a system for manufacturing a battery module, according to an embodiment of the present disclosure, will be described with reference to FIGS. 3 through 6.

Figure 1:
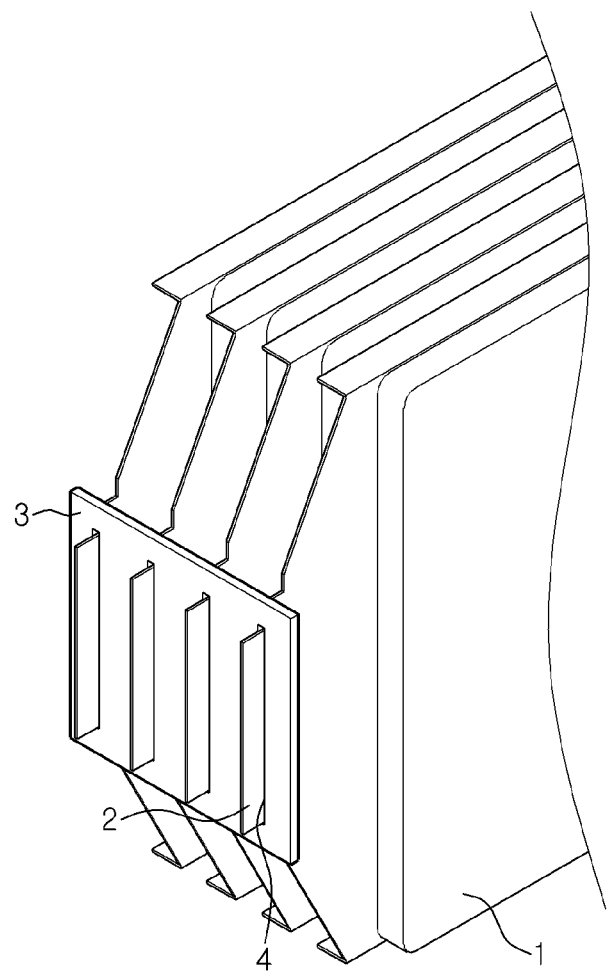
FIGS. 1 and 2 are diagrams of processes of combining an electrode lead and a bus bar while manufacturing a general battery module.
Figure 2:
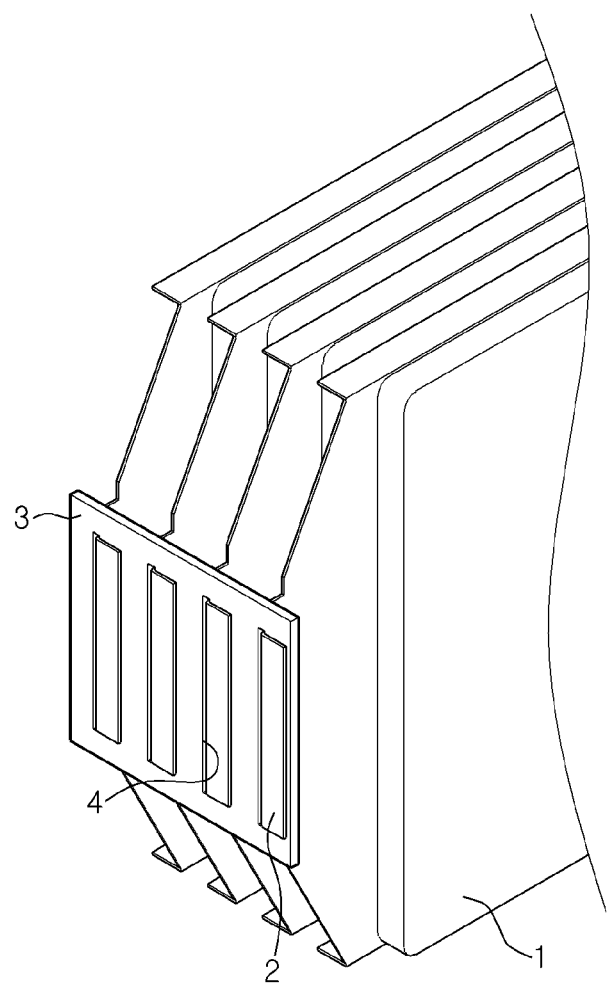
Figure 3:
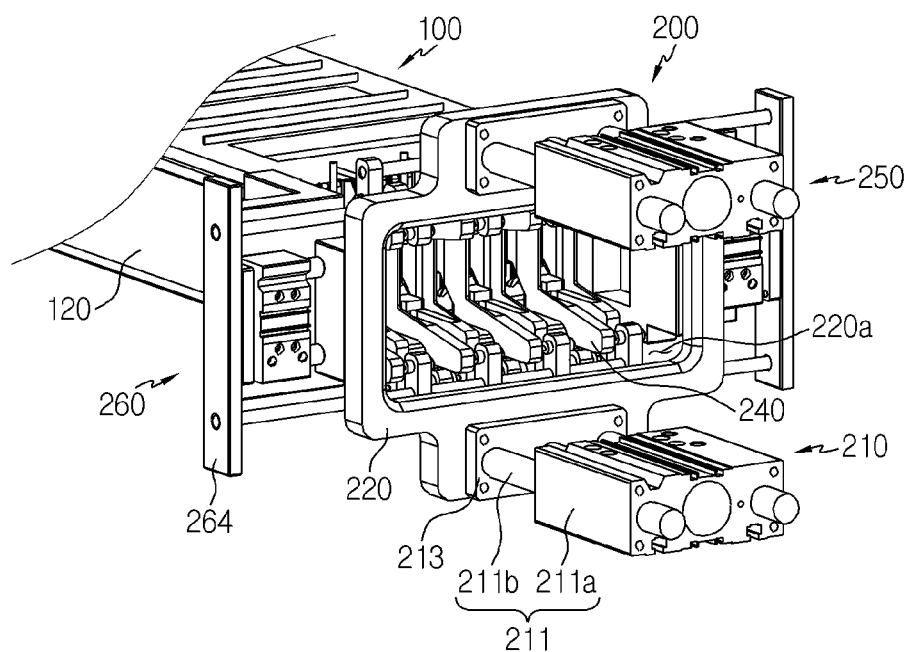
FIG. 3 is a diagram of a system for manufacturing a battery module, in which an automatic pressing jig apparatus and the battery module are combined to each other, according to an embodiment of the present disclosure.
Figure 4:
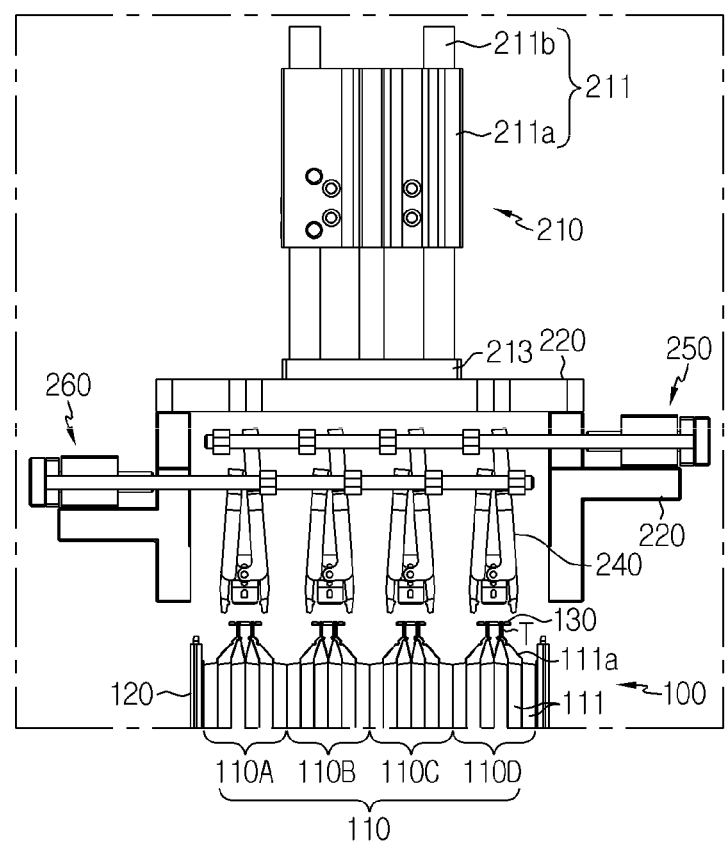
FIGS. 4 through 6 are diagrams respectively showing before, and after an electrode lead and a bus bar are pressed by an automatic pressing jig apparatus, according to an embodiment of the present disclosure.
Figure 5:
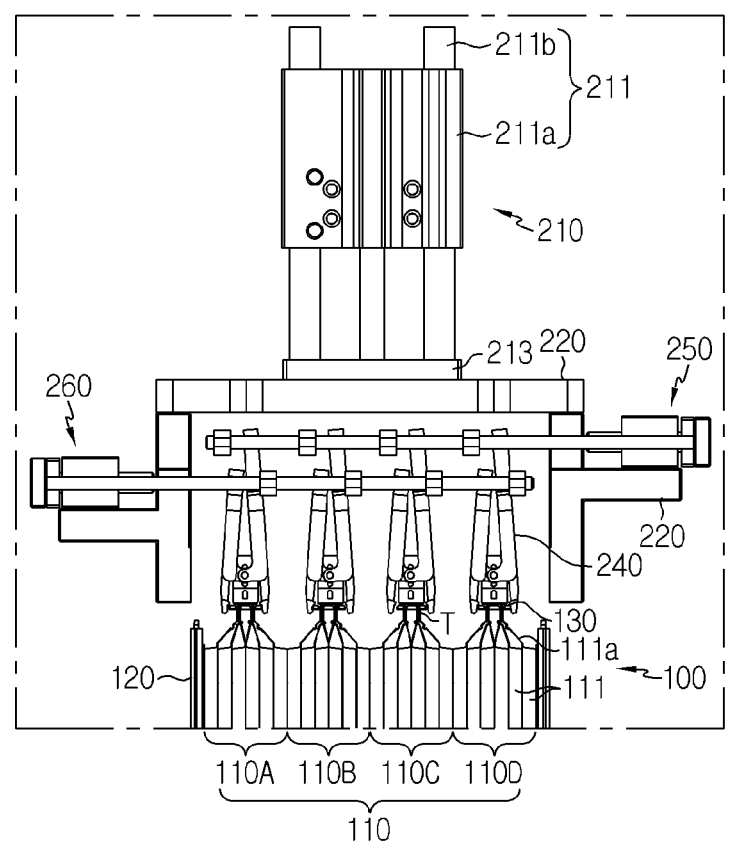
Figure 6:
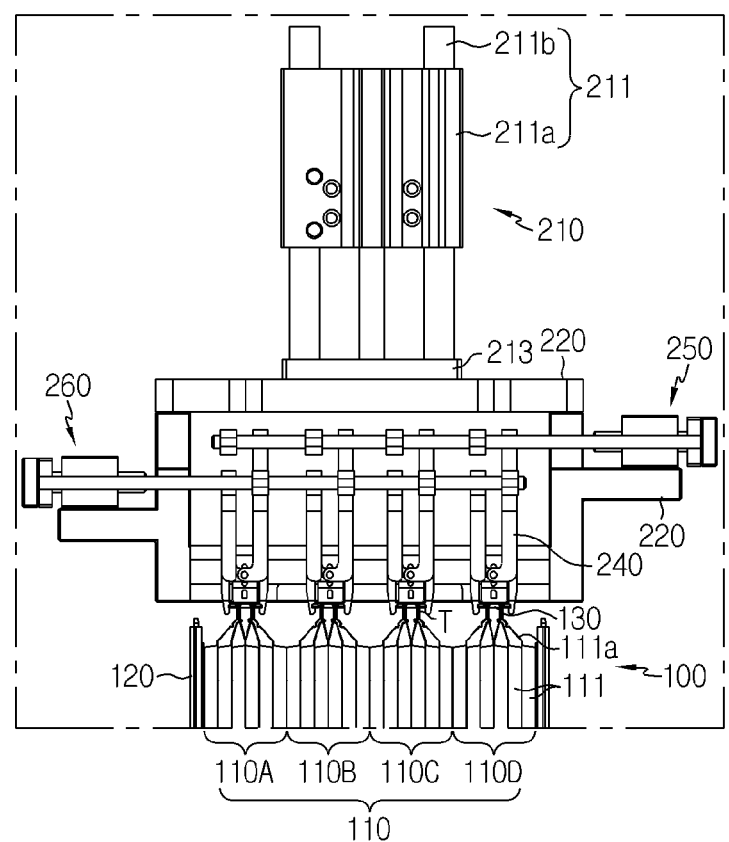

FIG. 3 is a diagram of a system for manufacturing a battery module, in which an automatic pressing jig apparatus and the battery module are combined to each other, according to an embodiment of the present disclosure, and FIGS. 4 through 6 are diagrams respectively showing before, during, and after an electrode lead and a bus bar are pressed by an automatic pressing jig apparatus, according to an embodiment of the present disclosure.

Referring to FIGS. 3 through 6, the system according to an embodiment of the present disclosure includes a battery module 100 and an automatic pressing jig apparatus 200 provided at one side of the battery module 100.

The battery module 100 includes a cell stack 110, a module case 120 accommodating the cell stack 110, and a bus bar 130 contacting a lead assembly T drawn out from the cell stack 110.

The cell stack 110 includes a plurality of unit cell stacks, i.e., first through fourth unit cell stacks 110A through 110D. In the drawings of the present disclosure, the cell stack 110 includes only the first through fourth unit cell stacks 110A through 110D, but the present disclosure is not limited by the number of unit cell stacks illustrated, and the number of unit cell stacks is not limited as long as the number is two or more.

Each of the first through fourth unit cell stacks 110A through 110D is realized as a plurality of battery cells 111 are stacked on each other while facing each other, and each of the battery cells 111 forming one unit cell stack by being stacked on each other includes an electrode lead 111a.

The electrode leads 111a included in each of the battery cells 111 forming each of the first through fourth unit cell stacks 110A through 110D form one or more groups, and are gathered to form one or more lead assemblies T.

The lead assembly T drawn out from the same unit cell stack is inserted into a lead slit 130a (see FIG. 10) formed at the bus bar 130, and closely contacts the bus bar 130 as the bus bar 130 is pressed by the automatic pressing jig apparatus 200.

The automatic pressing jig apparatus 200 is an apparatus for pressing the bus bar 130 such that the bus bar 130 and the electrode lead 111a closely contact each other, by being arranged at one side of the battery module 100, and includes a distance adjusting unit 210, a support frame 220, a contacting unit 240, and a pair of pressing units 250 and 260.

The distance adjusting unit 210 is a component that enables the support frame 220 to move by being connected to the support frame 220 such that the plurality of contacting units 240 are moved away from or close to the battery module 100.

The distance adjusting unit 210 may include a distance adjusting actuator 211 and a fixing plate 213 connected to the distance adjusting actuator 211.

The distance adjusting actuator 211 is not limited as long as the distance adjusting actuator 211 moves automatically or manually to allow up-and-down movement of the contacting unit 240. As an example of the distance adjusting actuator 211, an actuator that performs a piston reciprocating motion may be applied. In this case, the distance adjusting actuator 211 includes a distance adjusting cylinder 211a and a distance adjusting piston 211b inserted into the distance adjusting cylinder 211a and performing up-and-down movement in a direction towards or away from the battery module 100.

Also, the fixing plate 213 may be coupled to one side end of the distance adjusting piston 211b, and in this case, the distance adjusting actuator 211 and the support frame 220 are coupled to each other via the fixing plate 213.

The distance adjusting unit 210 may be provided at each of one side and the other side of the support frame 220 in a length direction, and in this case, the distance adjusting unit 210 and the support frame 220 may be further stably combined to each other compared to when only one distance adjusting unit 210 is provided.

The support frame 220 moves in the up-and-down direction according to movement of the distance adjusting unit 210 by being connected to the distance adjusting unit 210 as described above, and accommodates the plurality of contacting units 240 in an internal space thereof. Also, the support frame 220 functions as a base frame to which the pair of pressing units 250 and 260 may be fixed.

In other words, the support frame 220 enables the pair of pressing units 250 and 260 to move in the up-and-down direction according to the movement of the distance adjusting unit 210 in the up-and-down direction, thereby enabling the plurality of contacting units 240 connected to the pair of pressing units 250 and 260 to move together in the up-and-down direction.

The plurality of contacting units 240 are connected to the support frame 220 through the pair of pressing units 250 and 260, and thus are moved in a direction towards or away from the battery module 100 according to the movement of the distance adjusting unit 210 in the up-and-down direction.

The plurality of contacting units 240 move towards the battery module 100 according to descending motion of the distance adjusting unit 210 to simultaneously press each of the plurality of bus bars 130 included in the battery module 100, and press the end of the electrode lead 111a from a top of the bus bar 130 such that the electrode lead 111a does not protrude from a surface of the bus bar 130.

A specific structure of the contacting unit 240 and a specific pressing mechanism of the bus bar 130 will be described in detail below.

Hereinafter, the specific structure and a pressing operation of the contacting unit 240 applied to the present disclosure will be described in detail with reference to FIGS. 7 through 12 together with FIGS. 4 through 6.

Figure 7:
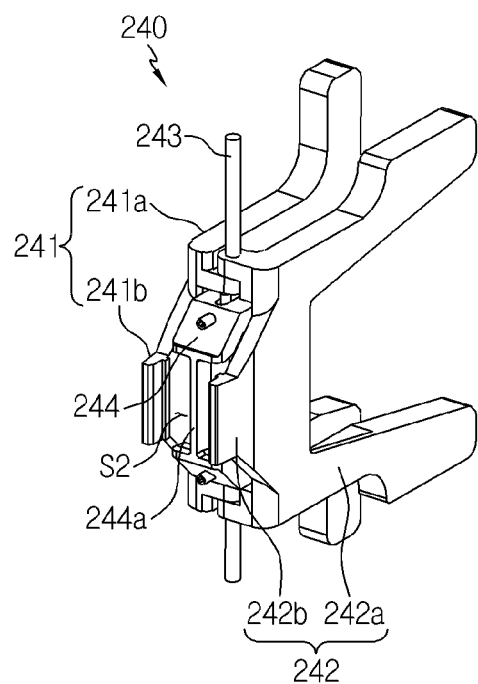
FIGS. 7 and 8 are diagrams of a contacting unit included in an automatic pressing jig apparatus, according to an embodiment of the present disclosure.
Figure 8:
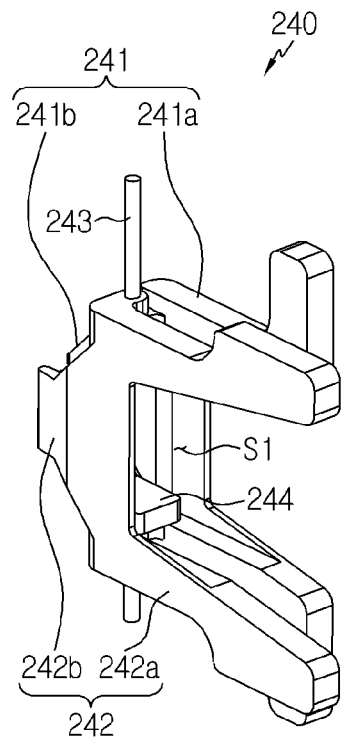
Figure 9:
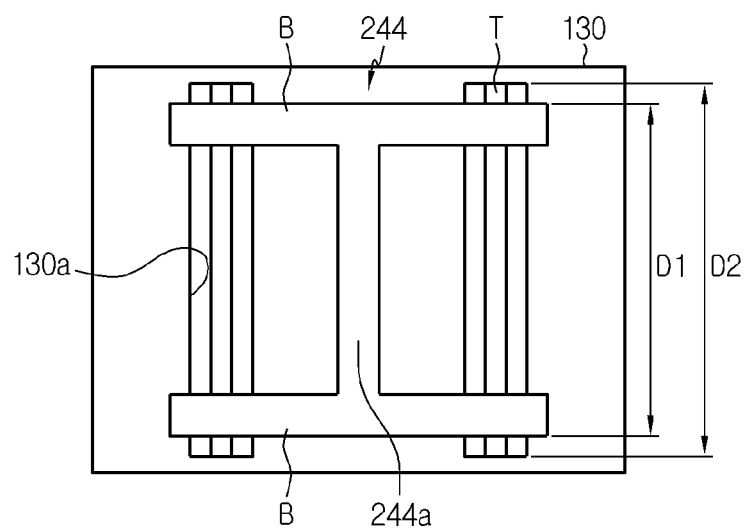
FIG. 9 is a diagram of a lead assembly being pressed by a lead pressing unit provided at an end of a pressing frame applied to the present disclosure, such as not to protrude outside a lead slit provided at a bus bar.
Figure 10:
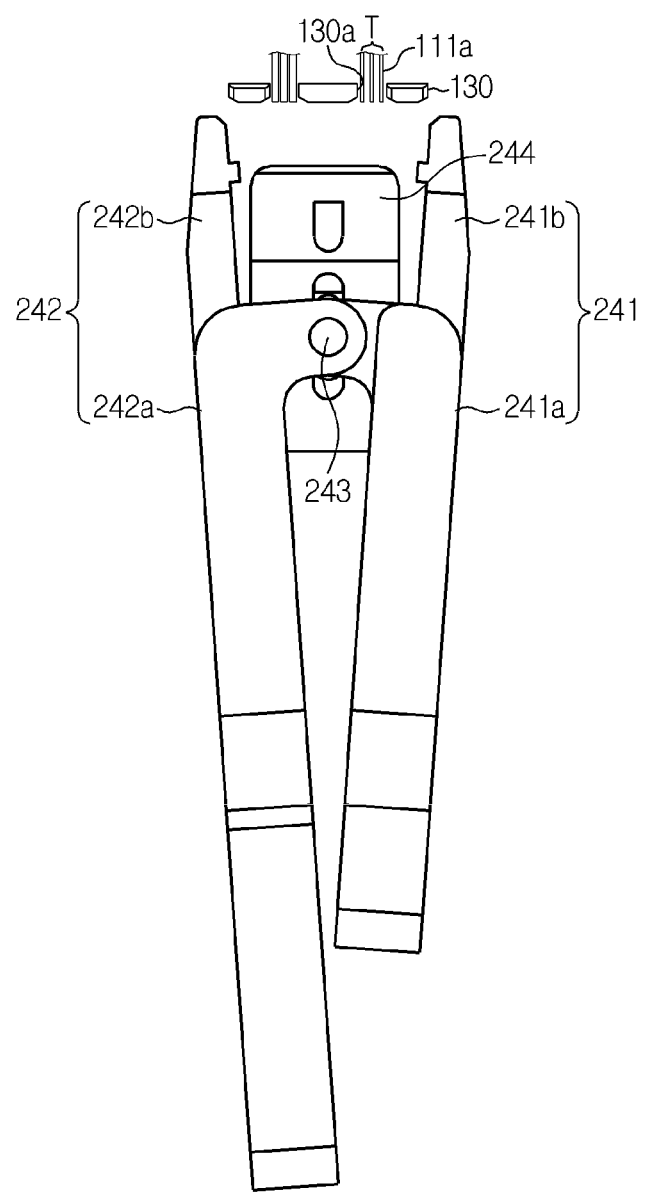
FIGS. 10 through 12 are diagrams of a pressing unit and a bus bar applied to the present disclosure, and an electrode lead, for describing processes of the electrode lead and the bus bar being pressed by a contacting unit.
Figure 11:
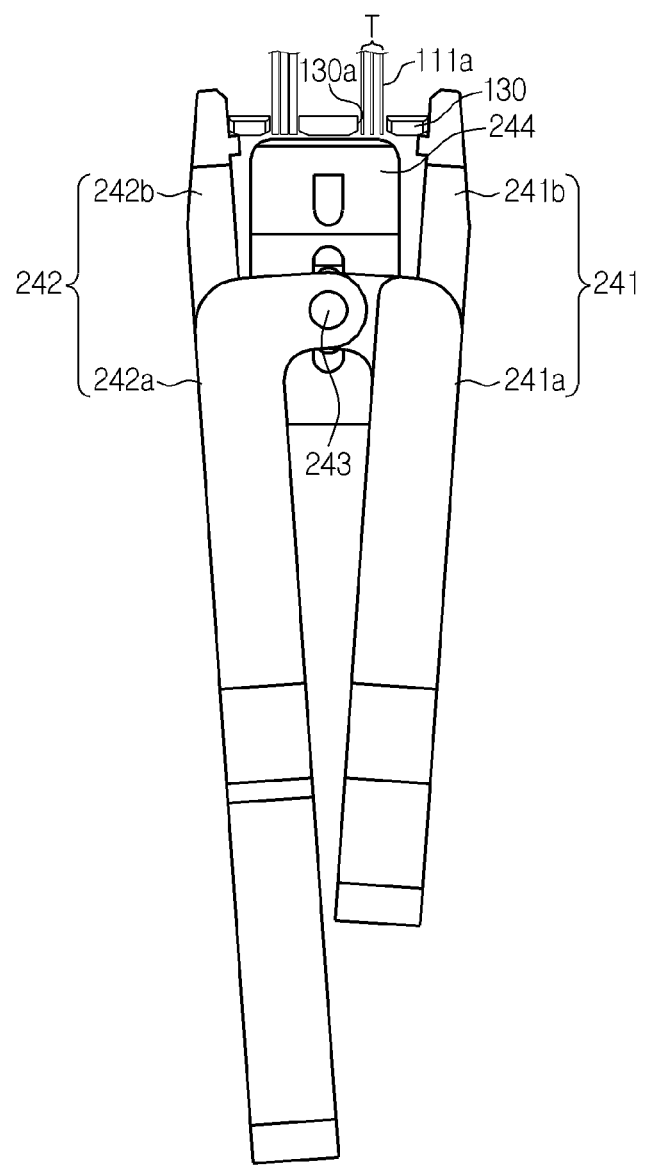
Figure 12:
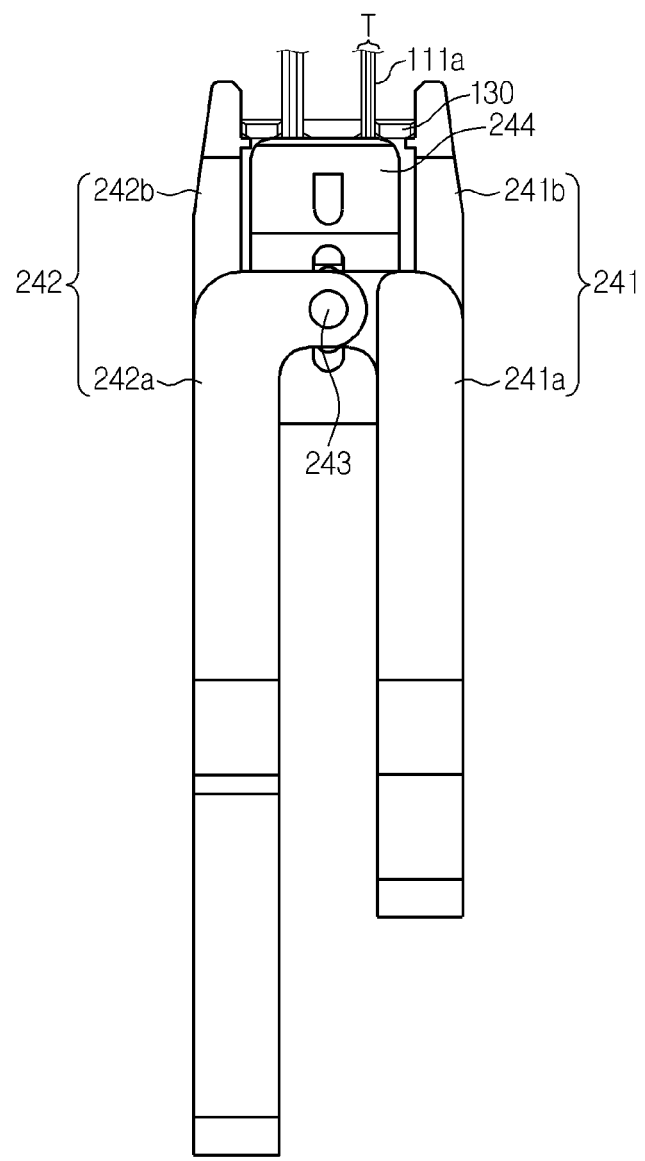

FIGS. 7 and 8 are diagrams of a contacting unit included in an automatic pressing jig apparatus, according to an embodiment of the present disclosure, FIG. 9 is a diagram of a lead assembly being pressed by a lead pressing unit provided at an end of a pressing frame applied to the present disclosure, such as not to protrude outside a lead slit provided at a bus bar. Also, FIGS. 10 through 12 are diagrams of a pressing unit and a bus bar applied to the present disclosure, and an electrode lead, for describing processes of the electrode lead and the bus bar being pressed by a contacting unit.

Referring to FIGS. 7 through 12, the contacting unit 240 applied to the automatic pressing jig apparatus 200 according to an embodiment of the present disclosure includes a pair of contacting frames 241 and 242, a hinge 243, and a lead pressing frame 244.

The pair of contacting frames 241 and 242 includes the first contacting frame 241 and the second contacting frame 242 that are coupled to each other by the hinge 243 to be relatively rotatable.

In the present disclosure, in the first contacting frame 241, based on a portion combined to the second contacting frame 242 by the hinge 243, a portion located at one side will be defined as a first distance adjusting portion 241a and a portion located at the other side will be defined as a first pressing portion 241b.

Similarly, in the second contacting frame 242, based on a portion combined to the first contacting frame 241 by the hinge 243, a portion located at one side will be defined as a second distance adjusting portion 242a and a portion located at the other side will be defined as a second pressing portion 242b.

While the first contacting frame 241 and the second contacting frame 242 are combined to each other by the hinge 243, a distance between the first pressing portion 241b and the second pressing portion 242b is increased when a distance between the first distance adjusting portion 241a and the second distance adjusting portion 242a is decreased. On the other hand, the first contacting frame 241 and the second contacting frame 242 are combined to each other by the hinge 243 such that the distance between the first pressing portion 241b and the second pressing portion 242b is decreased when the distance between the first distance adjusting portion 241a and the second distance adjusting portion 242a is increased.

With respect to using the automatic pressing jig apparatus 200, the bus bar 130 may be pressed from both sides by contacting the first pressing portion 241b and the second pressing portion 242b of the contacting unit 240 with both side portions of the bus bar 130 in a length direction by using the distance adjusting unit 210, and then operating the pair of pressing units 250 and 260 such that the distance between the first distance adjusting portion 241a and the second distance adjusting portion 242a is increased.

Meanwhile, as will be described below, a first pressing rod 253 is connected to an end of the first contacting frame 241 and a second pressing rod 263 is connected to an end of the second contacting frame 242. Accordingly, the end of the first contacting frame 241 and the end of the second contacting frame 242 extend in different directions such as not to face each other, such that interference does not occur between the first pressing rod 253 and the second pressing rod 263.

The lead pressing frame 244 is located in a space surrounded by the first and second contacting frames 241 and 242, and is fixed to the hinge 243 to move together with the first and second contacting frames 241 and 242.

Accordingly, the lead pressing frame 244 moves together when the contacting frames 241 and 242 move towards the battery module 100 by the distance adjusting unit 210, and contacts the top surface of the bus bar 130 and presses an end of the lead assembly T from upward such that the lead assembly T does not protrude from the top surface of the bus bar 130 when the pressing portions 241b and 242b of the contacting frame 241 contact the both side portions of the bus bar 130 in the length direction.

Meanwhile, a first open portion S1 is provided between the pair of contacting frames 241 and 242 combined to each other, the lead pressing frame 244 includes a pair of second open portions S2 communicating with the first open portion S1, and the pair of second open portions S2 is separated by a barrier wall 244a.

In other words, a portion of the lead pressing frame 244 contacting the lead assembly T has a shape of an H beam, and the pair of second open portions S2 located at both sides of the barrier wall 244a forming the H beam are provided at positions corresponding to the lead assembly T inserted into the lead slit 130a formed at the bus bar 130.

In particular, referring to FIG. 9, the portion of the lead pressing frame 244 contacting the lead assembly T includes a pair of horizontal bars B extending in parallel spaced apart from each other and the barrier wall 244a connecting center portions of the pair of horizontal bars B. The horizontal bar B and the barrier wall 244a extend in an approximate perpendicular direction.

A distance D1 between outer edge portions of the pair of horizontal bars B is equal to or less than a width D2 of the lead assembly T, i.e., a distance of the lead slit 130a. Accordingly, when the lead pressing frame 244 descends towards the bus bar 130, the horizontal bus bar B may contact the lead assembly T.

Both side ends of each of the pair of horizontal bars B in a length direction press both side ends of the lead assembly T in a width direction.

While the lead assembly T is prevented from protruding outside the lead slit 130a as the horizontal bar B presses the lead assembly T from upward as such, a laser beam may be irradiated or a welding rod may approach through the pair of second open portions S2 provided at both sides based on the barrier wall 244a, thereby welding the lead assembly T and the bus bar 130 to each other.

In other words, by forming the first and second open portions S1 and S2, a space for the welding rod or laser beam performing welding to bond the bus bar 130 and the lead assembly T to approach from the top of the contacting unit 240 towards the lead assembly T is provided.

Also, to enable the approach of the welding rod or laser beam as such, an open hole 220a (see FIG. 3) may be provided at the support frame 220 at positions corresponding to the first and second open portions S1 and S2.

Next, a specific structure of the pair of pressing units 250 and 260 applied to the automatic pressing jig apparatus 200 according to an embodiment of the present disclosure, and a combination relationship between the pair of pressing units 250 and 260 and the contacting unit 240 will be described in detail with reference to FIGS. 13 through 16, together with FIGS. 4 and 6 described above.

Figure 13:
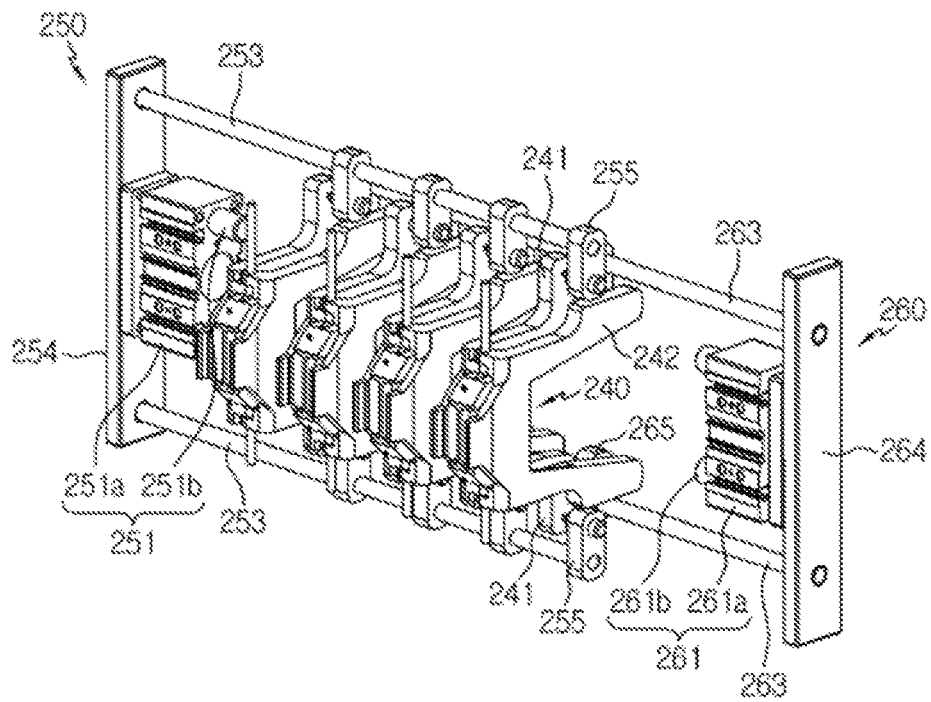
FIG. 13 is a diagram showing a pressing unit and a contacting unit combined to each other.
Figure 14:
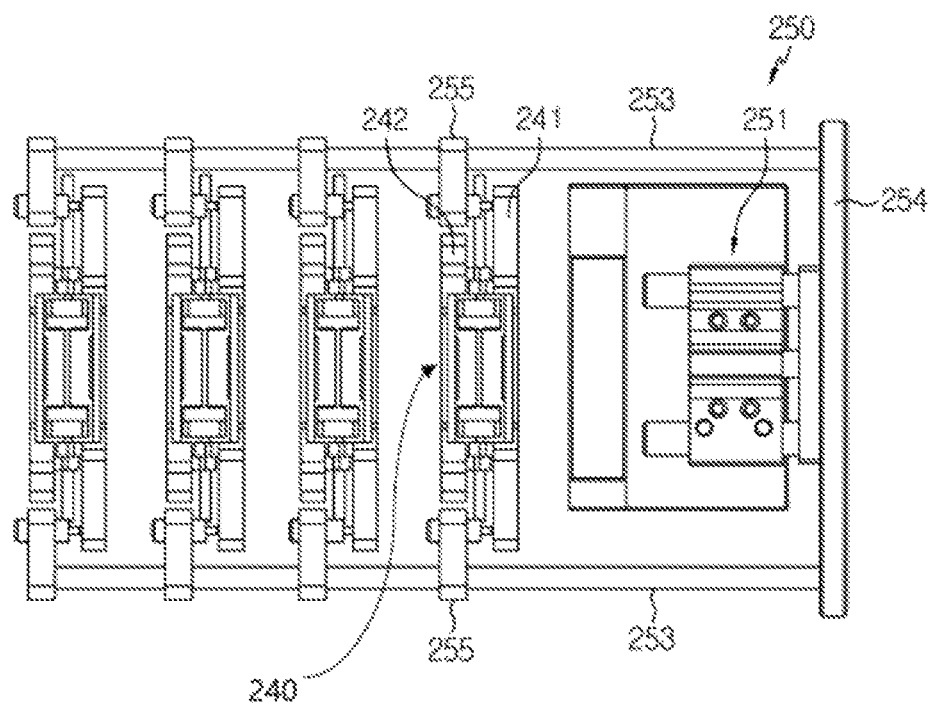
FIG. 14 is a diagram of a first pressing unit and a contacting unit combined to each other.
Figure 15:
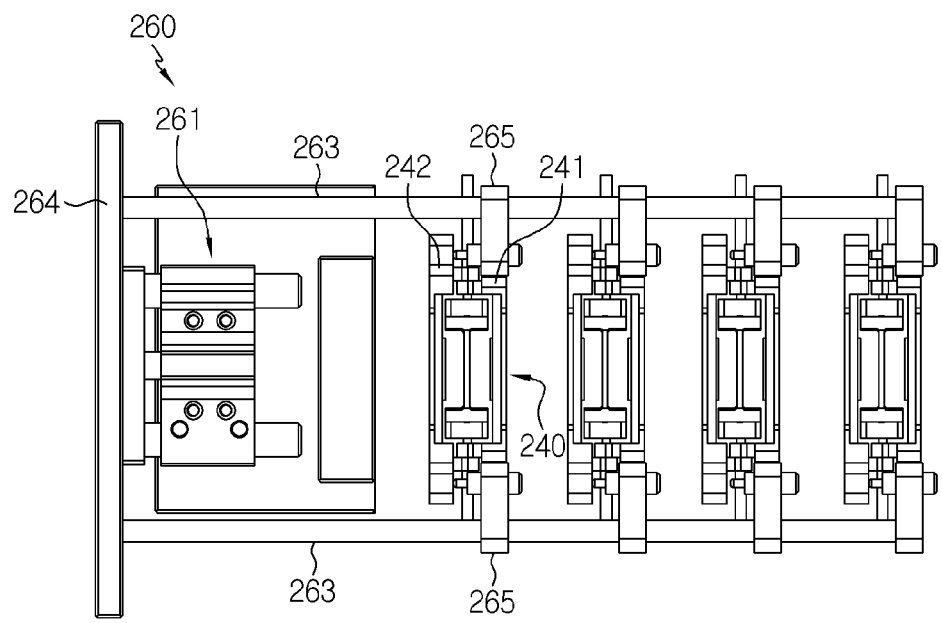
FIG. 15 is a diagram of a second pressing unit and a contacting unit combined to each other.
Figure 16:
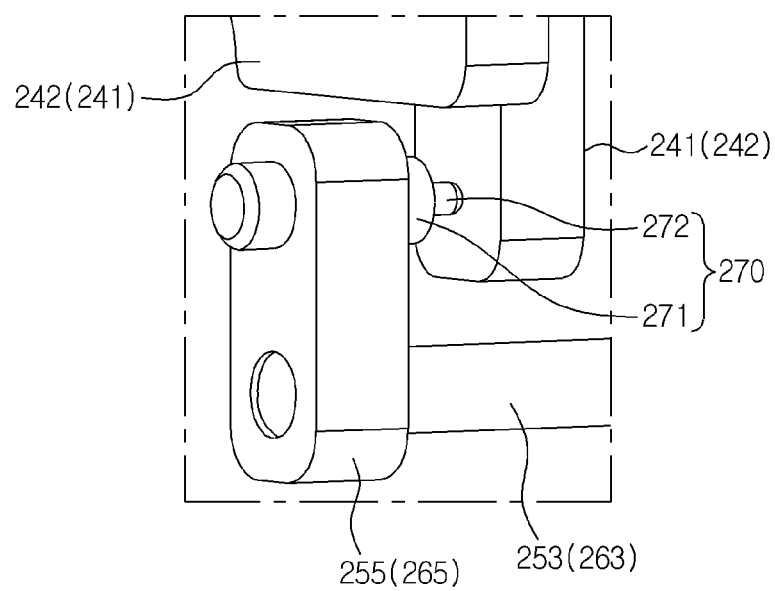
FIG. 16 is a diagram for describing a structure and operating principles of a connecting damper connecting a pressing unit and a contacting unit to each other.

FIG. 13 is a diagram showing a pressing unit and a contacting unit combined to each other. FIG. 14 is a diagram of a first pressing unit and a contacting unit combined to each other, and FIG. 15 is a diagram of a second pressing unit and a contacting unit combined to each other. Also, FIG. 16 is a diagram for describing a structure and operating principles of a connecting damper connecting a pressing unit and a contacting unit to each other.

First, referring to FIGS. 13 through 16 together with FIGS. 4 through 6, the pair of pressing units 250 an 260 includes the first pressing unit 250 fixed to one side of the support frame 220 and the second pressing unit 260 fixed to the other side of the support frame 220. In other words, the pair of pressing units 250 and 260 are fixed on the support frame 220 to move up and down when the support frame 220 moves up and down. Also, the pair of pressing units 250 and 260 adjust a pressing force of the plurality of contacting units 240 with respect to the bus bar 130 by being connected to the plurality of contacting units 240.

The first pressing unit 250 is located at one side of the plurality of contacting units 240 and includes a first pressing actuator 251, the first pressing rod 253, a first support plate 254, and a first connecting plate 255.

Similarly, the second pressing unit 260 is located at the other side of the plurality of contacting units 240 and includes a second pressing actuator 261, the second pressing rod 263, a second support plate 264, and a second connecting plate 265.

The first pressing actuator 251 is fixed to one side of the support frame 220 to move together with the support frame 220, and for example, may include a first pressing cylinder 251a and a first pressing piston 251b inserted into the first pressing cylinder 251a and movable in a direction towards or away from the contacting unit 240.

Similarly, the second pressing actuator 261 is fixed to the other side of the support frame 220 to move together with the support frame 220, and for example, may include a second pressing cylinder 261a and a second pressing piston 261b inserted into the second pressing cylinder 261a and movable in a direction towards or away from the contacting unit 240.

The first pressing rod 253 has one side connected to the first support plate 254 and the other side connected to the plurality of first contacting frames 241, and the first support plate 254 is connected to the first pressing actuator 251. Accordingly, the first pressing rod 253 enables the first contacting frame 241 to move in a direction away from or towards the second contact frame 242 according to movement of the first pressing actuator 251.

Similarly, the second pressing rod 263 has one side connected to the second support plate 264 and the other side connected to the plurality of second contacting frames 242, and the second support plate 264 is connected to the second pressing actuator 261. Accordingly, the second pressing rod 263 enables the second contacting frame 242 to move in a direction away from or towards the first contacting frame 241 according to movement of the second pressing actuator 261.

In particular, the first pressing rod 253 and the second pressing rod 263 are respectively connected to the first distance adjusting portion 241a and the second distance adjusting portion 242a, and accordingly, the first distance adjusting portion 241a and the second distance adjusting portion 242a rotate around a rotation shaft of the hinge 243 according to movement of the first pressing rod 253 and the second pressing rod 263, and thus the distance between the first distance adjusting portion 241a and the second distance adjusting portion 242a may be increased or decreased.

When the distance between the first distance adjusting portion 241a and the second distance adjusting portion 242a is decreased, the distance between the first pressing portion 241b and the second pressing portion 242b is increased, and thus a pressing force with respect to the bus bar 130 is weakened. On the other hand, when the distance between the first distance adjusting portion 241a and the second distance adjusting portion 242a is increased, the distance between the first pressing portion 241b and the second pressing portion 242b is decreased, and thus a pressing force with respect to the bus bar 130 is strengthened.

Accordingly, an apparatus operator may adjust the movement of the first pressing actuator 251 and the second pressing actuator 261 to perform pressing of the bus bar 130 by using the contacting unit 240.

Meanwhile, the first pressing rod 253 and the first contacting frame 241 may be combined via the first connecting plate 255, and similarly, the second pressing rod 263 and the second contacting frame 242 may be combined via the second connecting plate 265.

In other words, the first pressing rod 253 may penetrate and be combined to one side of the first connecting plate 255 in a length direction, and a connecting damper 270 may be combined to the other side of the first connecting plate 255 in the length direction. Similarly, the second pressing rod 263 may penetrate and be combined to one side of the second connecting plate 265 in a length direction, and the connecting damper 270 may be combined to the other side of the second connecting plate 265 in the length direction.

The connecting damper 270 is a component provided considering that pressing forces of the contacting unit 240 applied to the bus bars 130 are not completely the same, and performs a damping function to absorb pressing force tolerance.

A hydraulic damper, for example, may be applied to the connecting damper 370, and the connecting damper 270 may include a damper cylinder 271 penetrating and fixed to the connecting plates 255 and 265 and a damper piston 272 inserted into the damper cylinder 271 for piston reciprocating motion and penetrating and fixed to the pair of contacting frames 241 and 242.

As described above, according to the system for manufacturing a battery module, according to an embodiment of the present disclosure, the plurality of bus bars 130 are simultaneously pressed with same force by using the plurality of contacting units 240, and at the same time, the electrode lead 111a and the lead assembly T may be pressed downward from the top surface of the bus bar 130 such as not to protrude from the top surface of each bus bar 130. Thus, according to the system for manufacturing a battery module, according to an embodiment of the present disclosure, not only efficiency of a welding process is increased, but also contact between the lead assembly T and the bus bar 130 is increased, and in addition, the electrode lead 111a may be prevented from being damaged as the lead assembly T protrudes from the surface of the bus bar 130.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

LIST OF REFERENCE NUMERALS

100: Battery Module
110: Cell Stack
110a: First Unit Cell Stack
110b: Second Unit Cell Stack
110c: Third Unit Cell Stack
111: Battery Cell
111a: Electrode Lead
T: Lead Assembly
120: Module Case
130: Bus Bar
130a: Lead Slit
200: Automatic Pressing Jig Apparatus
210: Distance Adjusting Unit
211: Distance Adjusting Actuator
211a: Distance Adjusting Cylinder
211b: Distance Adjusting Piston
213: Fixing Plate
220: Support Frame
240: Contacting Unit
241: First Contacting Frame
241a: First Distance Adjusting Portion
241b: First Pressing Portion
242: Second Contacting Frame
242a: Second Distance Adjusting Portion
242b: Second Pressing Portion 243: Hinge
244: Lead Pressing Frame
B: Horizontal Bar
244a: Barrier Wall
S1: First Open Portion
S2: Second Open Portion
250: First Pressing Unit
251: First Pressing Actuator
251a: First Pressing Cylinder
251b: First Pressing Piston
253: First Pressing Rod
254: First Support Plate
255: First Connecting Plate
260: Second Pressing Unit
261: Second Pressing Actuator
261a: Second Pressing Cylinder
261b: Second Pressing Piston
263: Second Pressing Rod
264: Second Support Plate
265: Second Connecting Plate
270: Connecting Damper
271: Damper Cylinder
272: Damper Piston

What is claimed is:

1. An automatic pressing jig apparatus that closely contacts a lead assembly and a bus bar provided in a battery module to each other, the automatic pressing jig apparatus comprising:
 a plurality of contactors configured to simultaneously press each of a plurality of bus bars provided in the battery module and press an end of the lead assembly from a top of the plurality of bus bars to prevent the lead assembly from protruding from a surface of the plurality of bus bars;
 a pair of pressers connected to the plurality of contactors and configured to adjust a pressing force of the plurality of contactors with respect to the plurality of bus bars;
 a support frame supporting the pair of pressers; and
 a distance adjuster connected to the support frame and configured to ascend or descend the support frame to move the plurality of contactors away from or close to the battery module.

2. The automatic pressing jig apparatus of claim 1, wherein the plurality of contactors comprise a contacting frame moving downward by movement of the distance adjuster to press the plurality of bus bars from opposite sides.

3. The automatic pressing jig apparatus of claim 2, wherein the pair of pressers comprise a first presser provided at one side of the plurality of contactors and a second presser provided another side of the plurality of contactors,
 wherein the contacting frame comprises a first contacting frame connected to the first presser and a second contacting frame connected to the second presser and coupled to the first contacting frame via a hinge.

4. The automatic pressing jig apparatus of claim 3, wherein the plurality of contactors further comprise a lead pressing frame provided inside the contacting frame and moved downward together with the contacting frame by the distance adjuster to press the lead assembly from the top of the plurality of bus bars.

5. The automatic pressing jig apparatus of claim 3, wherein the first contacting frame comprises a first distance adjusting portion connected to the first presser and a first pressing portion contacting the plurality of bus bars, and
 wherein the second contacting frame comprises a second distance adjusting portion connected to the second presser and a second pressing portion contacting the plurality of bus bars.

6. The automatic pressing jig apparatus of claim 5, wherein the first contacting frame and the second contacting frame are combined to each other via the hinge to increase a distance between the first pressing portion and the second pressing portion when a distance between the first distance adjusting portion and the second distance adjusting portion is decreased, and decrease the distance between the first pressing portion and the second pressing portion when the distance between the first distance adjusting portion and the second distance adjusting portion is increased.

7. The automatic pressing jig apparatus of claim 3, wherein the first presser comprises a first pressing rod connected to the first contacting frame and a first pressing actuator directly or indirectly connected to the first pressing rod to move the first pressing rod in a direction towards or away from the plurality of contractors, and
 wherein the second presser comprises a second pressing rod connected to the second contacting frame and a second pressing actuator directly or indirectly connected to the second pressing rod to move the second pressing rod in a direction towards or away from the plurality of contactors.

8. The automatic pressing jig apparatus of claim 7, wherein an end of the first contacting frame connected to the first pressing rod and an end of the second contacting frame connected to the second pressing rod do not face each other to prevent the first pressing rod and the second pressing rod from interfering with each other.

9. The automatic pressing jig apparatus of claim 7, wherein the pair of pressers further comprise:
 a first connecting plate having one side coupled to the first pressing rod and another side coupled to an end of the first contacting frame; and
 a second connecting plate having one side coupled to the second pressing rod and another side connected to an end of the second contacting frame.

10. The automatic pressing jig apparatus of claim 9, further comprising a damper disposed between the first connecting plate and the first pressing rod and between the second connecting plate and the second pressing rod.

11. The automatic pressing jig apparatus of claim 4, wherein a first open portion is provided between the first contacting frame and the second contacting frame.

12. The automatic pressing jig apparatus of claim 11, wherein the lead pressing frame is fixed to the hinge and moves together with the contacting frame.

13. The automatic pressing jig apparatus of claim 11, wherein a portion of the lead pressing frame contacting the lead assembly has a shape of an H beam, a pair of second open portions communicating with the first open portion are provided at opposite sides of a barrier wall forming the H beam, and the pair of second open portions are provided at positions corresponding to the lead assembly.

14. The automatic pressing jig apparatus of claim 4, wherein a portion of the lead pressing frame contacting the lead assembly comprises a pair of horizontal bars extending in parallel spaced apart from each other and a barrier wall connecting center portions of the pair of horizontal bars, and
 wherein the pair of horizontal bars press the lead assembly.

15. The automatic pressing jig apparatus of claim 14, wherein a distance between outer edge portions of the pair of horizontal bars is equal to or less than a width of the lead assembly.

* * * * *